United States Patent [19]
Migrin et al.

[11] 4,232,549
[45] Nov. 11, 1980

[54] TWO STAGE FLOWMETER

[75] Inventors: Robert S. Migrin; Jerry A. Olson, both of Dearborn, Mich.

[73] Assignee: Eaton Corporation, Cleveland, Ohio

[21] Appl. No.: 966,844

[22] Filed: Dec. 6, 1978

[51] Int. Cl.³ .............................................. G01F 5/00
[52] U.S. Cl. .................................... 73/202; 73/861.63
[58] Field of Search ..................... 73/202, 203, 205 R, 73/213, 214

[56] References Cited

U.S. PATENT DOCUMENTS

| | | | |
|---|---|---|---|
| 1,985,397 | 12/1934 | Bassett | 73/254 |
| 2,667,072 | 1/1954 | Webster | 73/230 |
| 3,086,395 | 4/1963 | York | 73/214 X |
| 3,308,662 | 3/1967 | Maurer | 73/203 X |
| 3,407,657 | 10/1968 | Maver | 73/203 |
| 3,834,230 | 9/1974 | Auerbach | 73/199 |
| 4,012,957 | 3/1977 | Chiles et al. | 73/231 |
| 4,164,144 | 8/1979 | Kaiser et al. | 73/213 |

*Primary Examiner*—Herbert Goldstein
*Attorney, Agent, or Firm*—R. J. McCloskey; D. Wood; J. G. Lewis

[57] ABSTRACT

A low pressure drop air flowmeter for an automobile engine is disclosed. The meter contains a main air flow passage, a relatively small venturi to receive a portion of the air flow, pressure ports for sensing stagnation and static pressure and a set of swirl vanes disposed adjacent the outlet of the venturi and operative to impart a swirl to the remainder of the air in the main passage, thereby creating a reduced pressure at the venturi outlet for amplifying the pressure difference between the stagnation and static pressure without appreciably increasing the pressure drop across the flowmeter. A tertiary passage provides a path of fluid communication between points upstream and downstream of the swirl vanes. This passage can be selectively opened or restricted by a valve which, in the preferred embodiment of the invention, opens the tertiary passage with increasing overall flow rate. This arrangement results in a fluid flowmeter having a characteristic pressure drop which is less than that of a conventional device, particularly at high flow rates. Also disclosed is a solenoid valve operative to selectively sample stagnation pressure in the tertiary passage and signal pressure in the throat of the venturi and generate an electrical output signal as a function of the difference between these two pressure signals.

18 Claims, 5 Drawing Figures

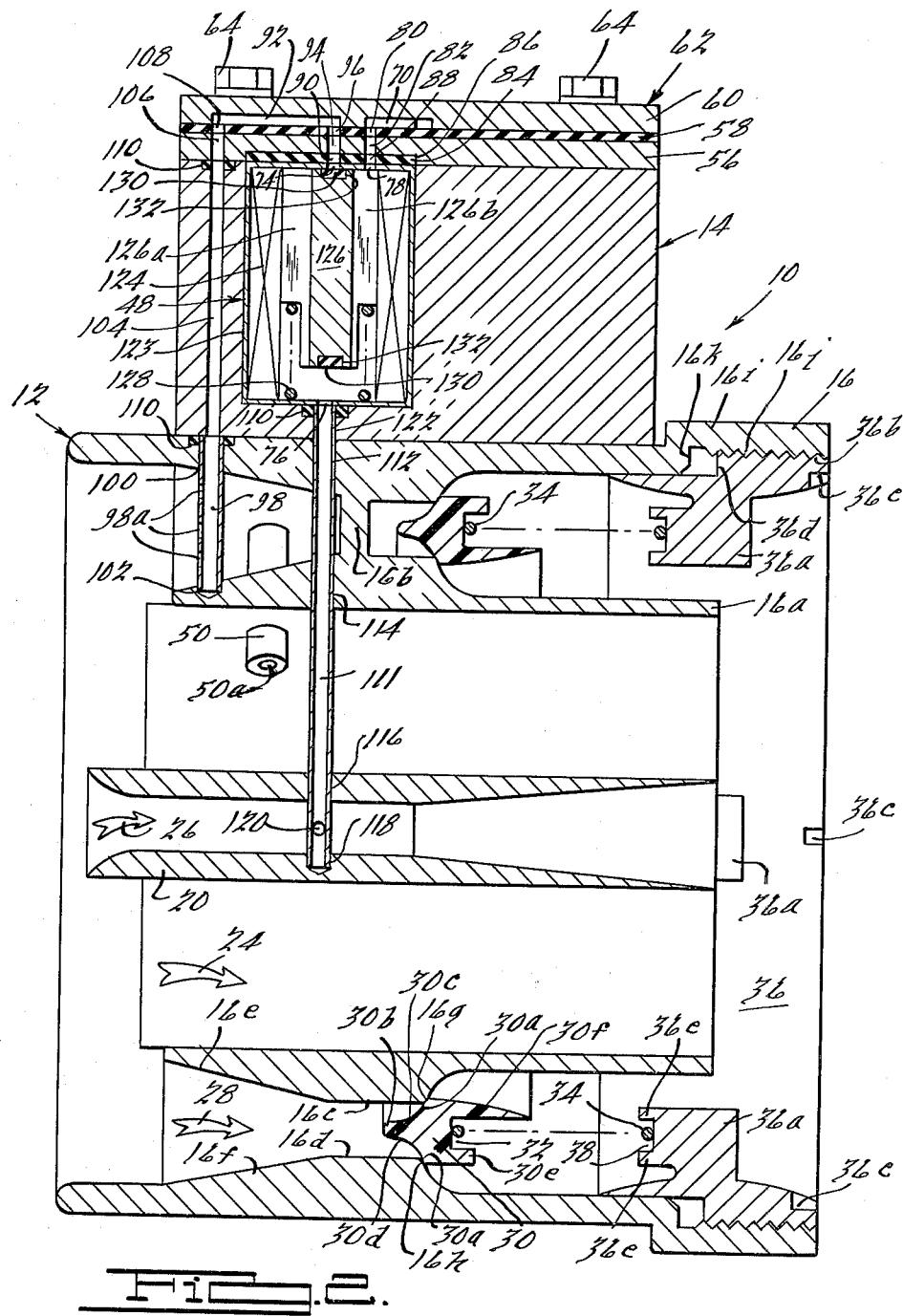

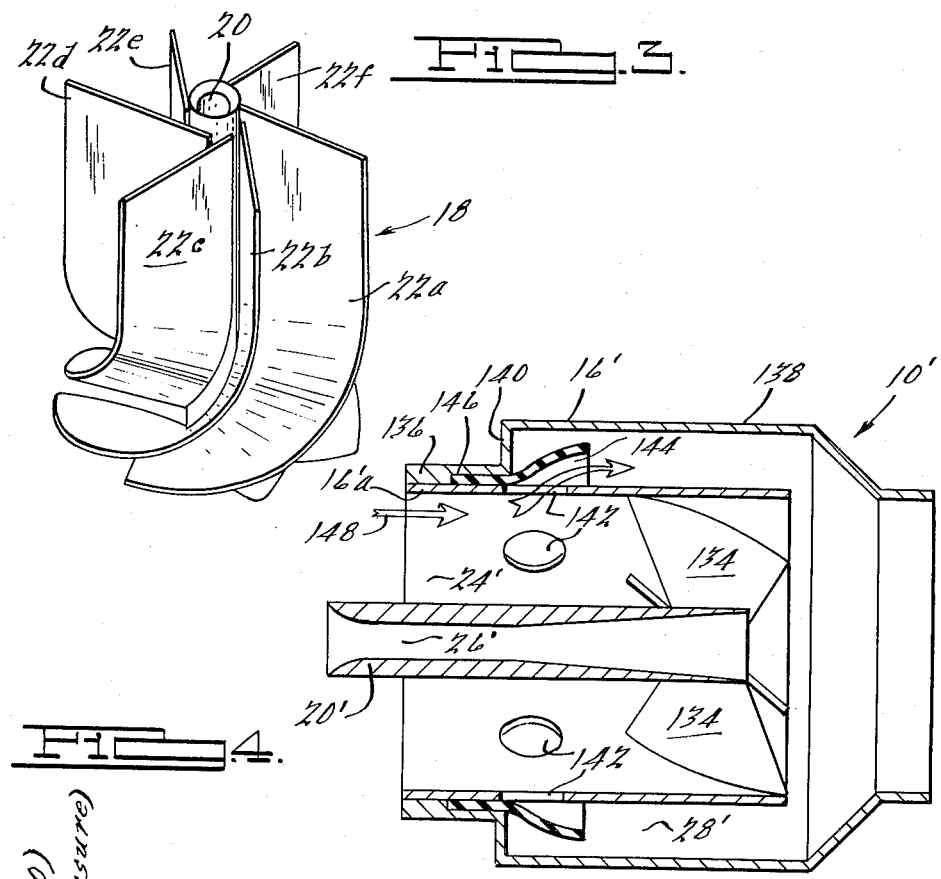
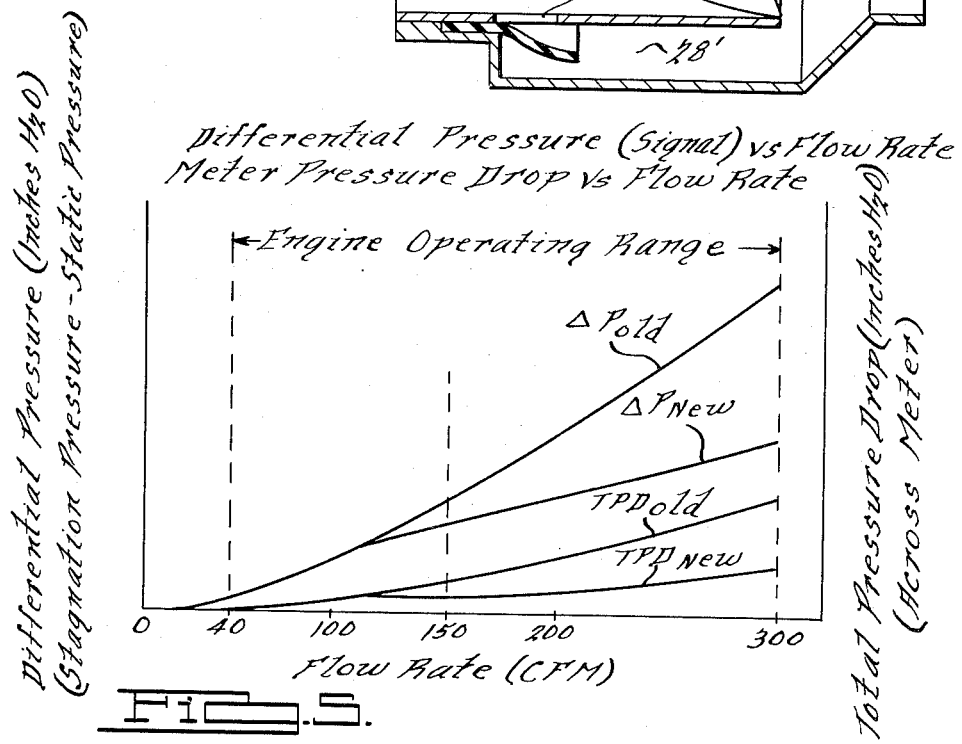

TWO STAGE FLOWMETER

INTRODUCTION

This invention relates to fluid flowmeters in general and particularly to such flowmeters designed specifically for use in automotive internal combustion engines.

CROSS REFERENCE

The invention described in the present application represents an improvement of that described in U.S. Ser. No. 845,751 filed Oct. 26, 1977, now U.S. Pat. No. 4,164,144 issued Aug. 14, 1979 and is related to the invention described in U.S. Ser. No. 898,267 filed Apr. 20, 1978, now U.S. Pat. No. 4,136,565 issued Jan. 30, 1979.

BACKGROUND OF THE INVENTION

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e., the drop in pressure is a drop in total pressure. Venturi flowmeters are low energy loss devices relative to orifice plate flowmeters since most of the pressure drop in the venturi throat is recoverable at the venturi outlet, i.e., the drop in pressure in the throat is due to an increase in kinetic energy of the fluid. However, when either of these flowmeters are used to measure fluid flow which varies over a wide range, such as airflow to an automotive engine, they either overly restrict total airflow at high engine speeds and loads if they are sized small enough to provide an adequate differential pressure signal at low engine speeds and loads, or they provide an inadequate differential pressure signal at low engine speeds and loads if they are sized larger.

BRIEF DESCRIPTION OF THE INVENTION

The present invention overcomes the above described shortcomings by providing a fluid flowmeter which sufficiently restricts airflow at relatively low flow rates to generate a useable pressure differential signal and reduces that restriction at higher flow rates to minimize overall pressure drop. This is accomplished by an improved flowmeter of the type including a passageway for the flow of fluid therethrough and a fluid flow sensing element disposed within the passageway operative to generate a signal as a function of the fluid flow, the improvement being a bypass passage which operates to selectively interconnect a point within the passageway which is upstream of the flow sensing element with a second point within the passageway which is downstream of the flow sensing element. This arrangement affords the selective diversion of some of the fluid which would otherwise flow through the passageway, thus reducing the overall pressure drop created thereby at predetermined flow rates.

According to another aspect of the invention, a valve is provided within the bypass passage which operates to selectively restrict the flow of fluid therethrough. This arrangement has the advantage of providing direct control of the amount of fluid flowing through the bypass passage and thus the operating characteristics of the flowmeter.

According to another aspect of the invention, the valve operates to decrease restriction of the bypass passage as a function of the flow rate of fluid through the flowmeter. This arrangement has the advantage of directing more and more fluid through the bypass passage with increasing flow rate and, thus lowering the total pressure drop across the meter at high flow rates.

According to another aspect of the invention, the valve operates to close the bypass passage when the flow rate of the fluid through the flowmeter falls below a predetermined value. This arrangement provides two stage operation by forcing all fluid to flow through the passageway at flow rates below a given level, thus, providing a relatively high pressure differential signal at low flow rates, and diverting much of the fluid flow through the bypass passage at relatively high flow rates, thereby lowering the total meter pressure drop.

According to another aspect of the invention, an adjustment mechanism is provided within the fluid flowmeter to selectively vary the predetermined value of the flow rate and the fluid within the main passage. This arrangement has the advantage of allowing easy, accurate and reproducible calibration of the flowmeter.

These and other features and advantages of this invention will become apparent upon reading the following specification, which, along with the patent drawings, describes and discloses a preferred illustrative embodiment of the invention in detail.

The detailed description of the specific embodiments makes reference to the accompanying drawings.

BRIEF DESCRIPTION OF THE DRAWINGS

FIG. 2, is an cross sectional view taken on line 2—2 of FIG. 1;

FIG. 3, is a perspective view of the swirl vane-venturi assembly employed within the flowmeter of FIG. 1;

FIG. 4, is a cross sectional view of an alternative embodiment of the fluid flowmeter; and FIG. 5, is a pressure differential signal response graph comparing the differential pressure and total meter pressure drop versus that in prior art units over a typical range of operation.

DETAILED DESCRIPTION OF THE SPECIFIC EMBODIMENTS

Figure 1:
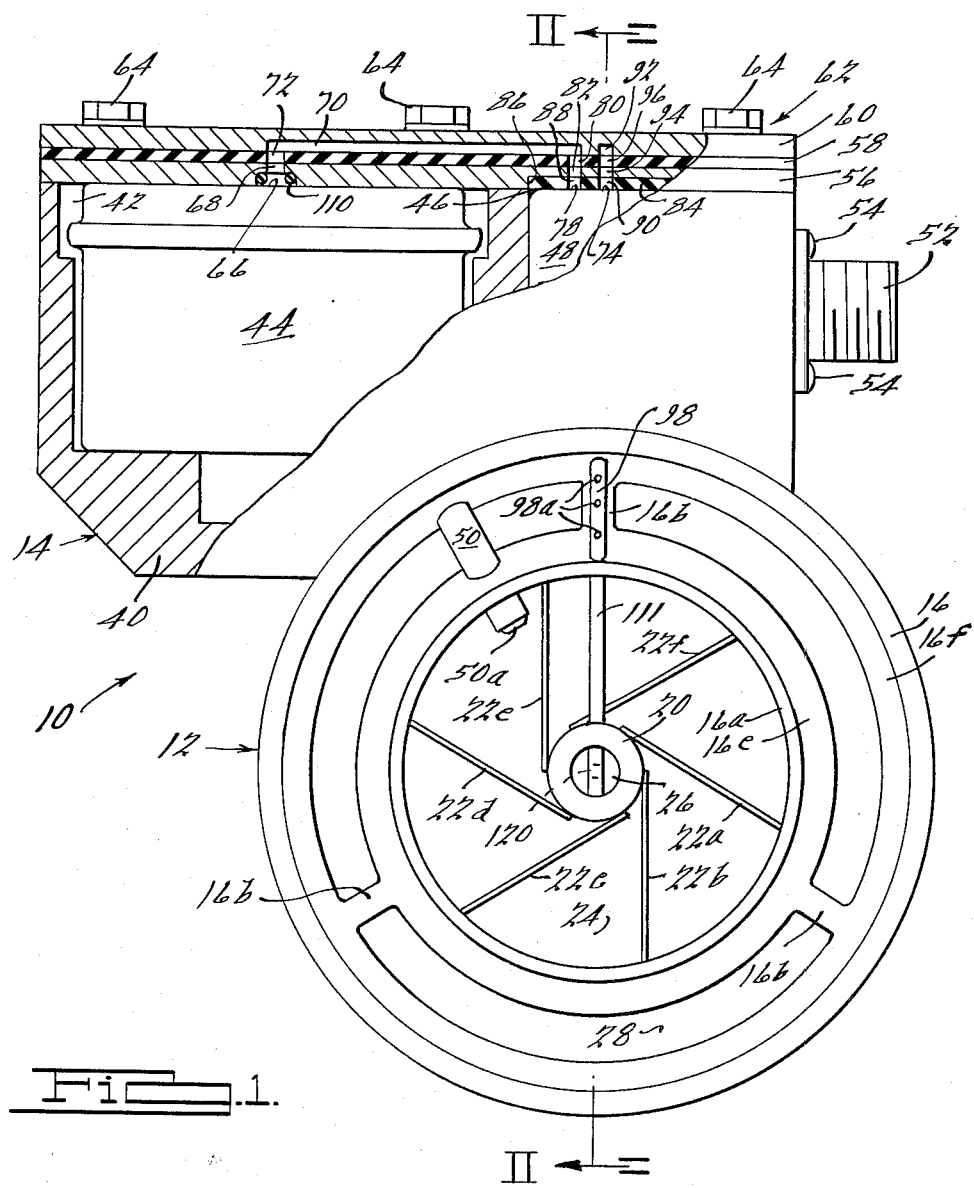
FIG. 1, is a top plan view of the preferred embodiment of the fluid flowmeter with a portion of its valve section broken away to illustrate the internal details thereof.

The preferred embodiment of the invention is illustrated in FIGS. 1 and 2. Flowmeter assembly 10 comprises a flowmeter section 12 and a valve section 14. Flowmeter assembly 10, as disclosed, is adapted for measuring the mass air flow to an internal combustion engine. However, flowmeter section 12, with or without valve section 14, may be used in other environments as a mass flowmeter or a volumetric flowmeter. With the exceptions that will be denoted herein, the present invention operates substantially as is described in U.S. Pat. No. 4,164,144 and represents an improvement thereof. Accordingly, U.S. Pat. No. 4,164,144 as well as related U.S. Pat. No. 4,136,565 is incorporated herein by reference.

Flowmeter section 12 comprises a tubular outer housing 16 which is open at both ends for inclusion in the air intake ducting system of an automobile internal combustion engine. As illustrated, air flowing through flowmeter assembly 10 will pass from left to right in FIG. 2.

Valve section 14 is mounted on the outwardmost circumferential wall of outer housing 16. Within outer housing 16 is a concentrically disposed inner housing 16a which has a smaller radius than outer housing 16 and depends therefrom by three circumferentially spaced bridges 16b. Outer housing 16, inner housing 16a and bridges 16b are preferably intergally formed of zinc, plastic or the like. However, it is contemplated that they could be formed discretely and subsequently assembled.

Inner housing 16a, like outer housing 16 is open at both ends to allow the flow of air therethrough. A swirl vane/venturi assembly 18 is disposed within inner housing 16a and comprises a venturi 20 which is disposed coaxially with housings 16 and 16a and six swirl vanes 22 (having subscripts a through f inclusive) which are circumferentially spaced within inner housing 16a, extending substantially radially (tangentially) outwardly from the outermost surface of venturi 20 to the innermost surface of inner housing 16a. Swirl vanes 22 are connected at their radially inward and outwardmost ends to the outermost surface of venturi 20 and the innermost surface of inner housing 16a such as by welding, thereby forming a single rigid structure. It is contemplated that venturi 20 and/or swirl vanes 22 could be intergally formed with outer housing 16, inner housing 16a and bridges 16b. Swirl vanes/venturi assembly 18 is shown in an end view in FIG. 1 and in perspective in FIG. 3. Because of the relatively complex shape of swirl vanes 22, they are not illustrated in section in FIG. 2, it being contemplated that one skilled in the art would appreciate their disposition within inner housing 16a based upon FIGS. 1 and 3.

When flowmeter section 12 is interconnected in a system flow path, it presents three parallel concentric passages through which the fluid or air flowing therein may pass. The first of these passages is the main passage defined by the volume radially intermediate the outermost surface of venturi 20 and the innermost surface of inner housing 16a and generally designated by arrow 24. Most fluid passing through flowmeter assembly 10 will flow through passageway 24 and will be acted upon by swirl vanes 22. A secondary passage through which air passing through flowmeter assembly 10 may flow is defined by venturi 20 and designated generally by arrow 26. A tertiary or bypass passage is defined by the volume radially intermediate the outsidemost surface of inner housing 16a and the inner surface of outer housing 16 which is generally designated by arrow 28. All air flowing through flowmeter assembly 10 will thus pass through one of the three passages 24, 26 or 28. Tertiary passage 28 is annular with the exception that it is interrupted at three points by bridges 16b. It is a prime consideration in air flowmeters of this type that the total pressure drop across flowmeter assembly 10 be minimized. Thus, the cross sectional area of bridges 16b will be reduced to a minimum to effect this desired characteristic. Venturi 26 may be replaced by a straight wall tube or a substantially straight wall tube. However, the venturi 20 has been found to provide a lower static pressure than straight wall tubes, particularly when the total air flow through the flowmeter is low, and therefor provides a greater differential pressure signal.

Air passing through passages 26 and 24 are operated upon by swirl vane/venturi assembly 18 and inner housing 16a substantially as described in the above referenced flowmeter U.S. Pat. Nos. 4,164,144 and 4,136,565 with relatively minor exceptions. Swirl vanes 22 extend in the upstream direction substantially the entire length of venturi 20. This provides a preswirl straightening function which was accomplished by seperate straighting vanes in the above referenced applications. Swirl vanes 22 transition from an orientation substantially parallel to air flow at a point approximately axially midway along venturi 20 to an orientation substantially normal to the original direction of air flow within passage 24 at a point adjacent the exit of venturi 20. This creates a low pressure region at the outlet of venturi 20 but results in a much lower total pressure drop because of the gradual transition of swirl vanes 22 rather than a substantially flat acutely angled swirl vane as described in the previous applications referenced hereinabove. It is contemplated that any number of structural variations of swirl vanes 22 can be empirically derived therefrom given a set of system perameters. The arrangement of swirl vanes 22 described herein are therefor intended as being illustrative only.

Although the preferred embodiment of the invention is described as having a main passage 24, a secondary passage 26 and a bypass or tertiary passage 28, it is understood that, in the broadest sense, the invention contemplates the application of a bypass passage with a flowmeter having a single passageway such as that described in U.S. Pat. No. 3,307,396 to Graffo.

Approximately midway axially along inner housing 16a is an area of increased wall thickness 16c projecting into tertiary passage 28. A second area of increased wall thickness 16d is formed in outer housing 16 and also projects into tertiary passage 28. Upstream of areas of increased wall thickness 16c and 16d are transitional areas 16e and 16f respectively which define a throat or inlet to tertiary passage 28. The inlet defined by transition areas 16e and 16f is gradual to enhance the air flow therethrough and to reduce any pressure drop caused thereby. The downstream ends of areas of increased wall thickness 16c and 16d define a second set of transition areas 16g and 16h respectively. Transition areas 16g and 16h define valve seats. A valving element 30 is disposed within tertiary passage 28 and is mounted for axial travel therein. Valving element 30 defines two upstream facing symmetrical valve lands 30a which are complimentary with the seats defined by transition areas 16g and 16h. Valving element 30 is illustrated in FIG. 2 in its upwardmost or upstreammost limit of travel in which tertiary passage 28 is closed. In this position, all air flowing through flowmeter assembly 10 passes through either main passage 24 or secondary passage 26. Valving element 30 has an upstream facing protuberence 30b which defines a radially inwardly and a radially outwardly transitional surface 30c and 30d respectively which terminate in valve lands 30a.

A relatively short skirt or rib 30e depends downstream from the radially outwardmost edge of valving element 30. A relatively long skirt 30f depends in the downstream direction from the radially innermost surface of valving element 30. The area between skirts 30e and 30f defines a first spring land 32 within which is disposed the upstreammost end of coil spring 34. The downstreammost end of spring 34 is supported by four radially inwardly projecting circumferentially spaced spring mounting stand-offs 36a. Stand-offs 36a are intergally formed with and depend from a spring adjustment ring 36 which is substantially cylindrical and is disposed coaxially within outer housing 16. Outer housing 16 has an area of increased diameter 16i at the downstream end thereof having threads 16j formed on the inside wall thereof. Spring adjustment ring 36 has radially outwardly projecting threads 36b formed on the circumferential edge thereof which mate with threads 16j in outer housing 16. Four keyways 36c are formed on the inside circumferential surface of spring adjustment ring 36 to accommodate a spanner wrench or the like when assemblying spring adjustment ring 36 with outer housing 16. The area of transition between area a increased diameter 16i and the adjoining portion of outer housing 16 defines an abutment surface 16k. Spring adjustment ring 36 has an increased diameter upon which threads 36b are formed which defines an upwardly facing abutment surface 36d. The point at which surfaces 16k and 36d come into contact with one another defines the upward limit of travel of spring adjustment ring 36 with respect to the rest of flowmeter assembly 10. Each spring support stand-off 36 has two upstream projecting circumferentially disposed skirts 36e depending therefrom. The area between skirts 36e define a second spring land 38 which receives a downstreammost end of coil spring 34. When assembled, spring 34 is in a slight compression set thereby biasing valving element 30 into its upstreammost limit of travel as illustrated in FIG. 2.

In operation, at relatively low air flow rates, the pressure differential across valving element 30 from air passing through passages 24 and 26 and the air impinging against surfaces 30c and 30d of valving element 30 are not of sufficient magnitude to generate an axial force which will overcome the biasing effect of spring 34. Thus, all of the air will flow through main passage 24 and secondary passage 26 as described in the above referenced applications. As the air flow increases, the pressure differential across valving element 30 will increase to the point wherein it will overcome the reaction force of of spring 34 and displace valving element 30 in the downstream direction. This will release the sealing engagement between the seats defined by transition areas 16g and 16h of inner and outer housing 16a and 16 respectfully with valve lands 30a of valving element 30 whereby a small portion of the air flowing through flowmeter assembly 10 will pass through tertiary passage 28. As total air flow rate increases further, valving element 30 will be displaced downstream even further under the influence of the axial force component of the air impinging against valving element 30, permitting larger and larger percentage of the total air flowing through flowmeter assembly 10 to pass through tertiary passage 28. This effectively allows much of the air flowing through flowmeter assembly 10 to spill over or bypass the actual metering or restrictive portion of flowmeter assembly 10 which results in a substantially lower total pressure drop across the device at high flow rates. Although a lower pressure differential signal is generated at high flow rates, this is of relatively little concern, the emphasis in these types of devices being the lowering of the overall pressure drop at high flow rates. The air flow rate at which valving element 30 is first displaced is determined by the position of spring adjustment ring 36. By threadably displacing spring adjustment ring 36 further upstream, spring 34 is further compresses, thus requiring larger combined air pressure differential and impingement forces be impressed upon valving element 30 to open the valve. Alternately, to lower the effective flow rate at which the valve is opened, spring adjustment ring 36 need merely be unthreaded or displaced axially downwardly from the position illustrated.

The spring constant of spring 34 is relatively low so as to allow opening of the bypass valve at approximately mid-range of normal engine operation. For example, in a typical passenger car automobile engine, the flow rate experienced in all modes of operation will fall below 300 cubic feet per minute (cfm). Experience has found that extremely accurate flow rate measurements are required at the low end of that range, i.e., below 120 cfm, and measurements of flow rate above that point, although being of importance, require substantially less accuracy. Experimental usage has found that an initial displacement of valving element 30 in the range of 140-160 cfm is desireable and resulted in acceptable compromise of high signal level at relatively low flow rates and low total pressure drop at relatively high flow rates.

The contours of inner and outer housings 16a and 16 respectively, as well as valving element 30 are uniform around the entire circumference of flowmeter section 12 with the exception of four localized bridges 16b. Protuberence 30b and transition surfaces 30c and 30d are symmetrical and designed to promote stability of valving element 30 when it is displaced downwardly from the position illustrated. Specifically, as air flowing through tertiary passage 20 impinges upon protuberence 30b, it is effectively bisected whereby approximately half the air flow within tertiary passage 28 will be diverted radially inwardly of valving element 30. The air impinging against transition surface 30c will tend to impart a downwardly directed axial force vector as well as a radially outwardly directed force vector upon valving element 30. The air impinging upon transition surface 30d will tend to impart a downwardly directed axial force vector and a radially inwardly directed force vector upon valving element 30. Inasmuch as the air flow is substantially evenly divided radially inwardly and outwardly of valving element 30, the radial components or vectors imparted upon valving element 30 will cancel one another and the axial components will be additive. Thus, the forces imparted by the air within tertiary passage 28 will directly counteract the force applied by spring 34. This will promote stability of valving element 30 when it is in an intermediate position to eliminate any radial forces or chatter. Valving element 30 is also symmetrical circumferentially, which further enhances stability. The actual contours of outer and inner housings 16 and 16a respectively and valving element 30 are illustrative in nature. It is contemplated that any number of variations can be derived therefrom given the present disclosure.

The material selected for valving element 30 is preferrably characterized as being a relatively light weight but highly stable, i.e., not susceptible to warping or distorting from the relatively high temperatures. A good material is glass filled Delrin which is a trade name of I. E. Dupont. In the preferred embodiment of the invention spring adjustment ring 36, including integral spring support stand-offs 36a are formed of aluminum or other suitable material. Long skirt 30f is provided in valving element 30 to promote long term structural stability as well as dynamic stability. Skirt 30f is positioned relatively closely to the inside most surfaces of the individual coils of spring 34. When valving element 30 is deflected in the normal manner, i.e., purely axially, skirt 30f will not contact coil 34. However, if valving element 30 begins to rock or be displaced any way other than axially, skirt 30f will contact the coils of spring 34 to prevent further radial displacement or rotation of valving element 30.

In the preferred embodiment of the invention, swirl vanes 22 are preferably constructed from brass or stainless steel shimstock but it is contemplated that any other suitable material can be substituted. Additionally, it is to be understood that swirl vanes 22 as shown in FIG. 3 are for illustration purposes only and that any number of obvious variations therefrom can be made. The specific swirl vane arrangement illustrated was derived empirically during research and development involving a specific engine wherein it was found that 6 blades (swirl vanes 22a through 22f) resulted in an optimal low pressure region at the outlet of venturi 20 when they were transitioned from an infinite pitch at the mouth of venturi 20 to approaching a zero pitch adjacent the exit of venturi 20 through a circumferential transition of approximately 120 degrees.

Valve section 14 comprises an aluminum housing 40 which is mounted to the outside surface of flowmeter section 12 such as by welding or the like. It is also contemplated that housing 40 could be integrally molded with outer housing 16. Housing 40 contains a first cavity 42 which receives a pressure transducer 44 and a second cavity 46 which receives a solenoid 48. Pressure transducer 44 may be of any several well known types. Herein, transducer 44 is an absolute pressure transducer of the type described in Society of Automotive Engineer (SAE) Paper 7707397 and manufactured by the Instruments Division of Bunker Remo Corporation. Transducer 44 measures the absolute stagnation and static pressure within flowmeter assembly 10 and produces electrical output signals representative of each pressure. These signals may be processed by an electronic logic system to produce a signal representative of the volumetric air flow through the flowmeter or, since the stagnation pressure is compared with absolute pressure, the signals may be processed with an absolute air temperature signal provided by a temperature sensor 50 in main passage 24 to produce a signal representative of mass air flow through flowmeter assembly 10. Temperature sensor 50 passes through apertures in inner housing 16a and outer housing 16. The temperature sensing element 50a of temperature sensor 50 is disposed within main passage 24 to sense the temperature of the air flowing therethrough. Sensor 50 passes through housing 16 and 16a into housing 40 wherein electrical leads (not illustrated) are routed through channels in housing 40 to an electrical connector 52. Electrical connector 52 is affixed to housing 40 by screws 54 and is adapted to electrically interconnect flowmeter assembly 10 with an electronic logic system.

Cavities 42 and 46 are closed by a cover assembly 62 comprising a first cover plate 56, a gasket 58 and a second cover plate 60. Cover assembly 62 is affixed to housing 40 by six bolts 64 which pass through registering apertures and first cover plate 56, gasket 58 and second cover plate 60 and threadably engage housing 40.

Pressure transducer 44 is a single inlet pressure sensing port 66 which registers with an inlet aperture 68 in first cover plate 56. Aperture 68, in turn, communicates with a channel 70 defined by the insidemost surface of second cover plate 60 through an aperture 72 in gasket 58. Solenoid 48, as described in the two above described U.S. Patents, is a three port device including two axially aligned outlet ports 74 and 76 as well as a single inlet port 78 spaced radially from outlet ports 74 and 76.

Channel 70 terminates adjacent inlet port 78 and communicates therewith through apertures 80 and 82 in gasket 58 and first cover plate 56 respectively. Additionally, a second gasket 84 overlays the end of solenoid 48 adjacent cover assembly 62 and is disposed within a relief 86 within first cover plate 56. Gasket 84 has two apertures 88 and 90 which register with ports 78 and 74 respectively. Port 74 of solenoid 48 communicates with a second channel 92 through aperture 90 in gasket 84 and overlaying apertures 94 and 96 in first cover plate 56 and gasket 58 respectively.

A stagnation pressure sensing tube 98 is disposed within tertiary passage 28, passing radially outwardly through an aperture 100 in outer housing 16 and partially radially inwardly through a counterbore 102 on the outsidemost wall of inner housing 16a. Stagnation pressure sensing tube 98 is open at its radially outwardmost end, closed at its radially inwardmost end and has three apertures 98a formed therein spaced radially within tertiary passage 28 and facing upstream. The radially outwardmost opening of stagnation pressure sensing tube 98 registers with a radially disposed stagnation pressure passageway 104 formed in housing 40. Stagnation pressure passageway 104 passes through registering apertures 106 and 108 formed in first cover plate 56 and gasket 58 respectively to communicate with channel 92 formed in the inner surface of second cover plate 60. O-rings 110 are provided for sealing at the point of interconnection of stagnation pressure sensing tube 98 and stagnation pressure passageway 104, stagnation pressure passageway 104 and aperture 106, as well as pressure transducer exit port 66 and aperture 68.

A static pressure sensing tube 111 passes radially inwardly through apertures 112 and 114 in outer housing 16 and inner housing 16a respectively, tertiary passage 28, main passage 24, and aperture 116 in one wall of venturi 20, secondary passage 26 and finally partially through the second wall of venturi 20 within a counterbore 118. Static pressure sensing tube 111 is closed at its radially inwardmost end and open at its radially outwardmost end. Additionally, static pressure sensing tube 111 has static pressure sensing ports 120 which open within secondary passage 26 (the throat of venturi 20) normally to the direction of air flow. Static pressure sensing tube 111 passes radially outwardly beyond the outermost surface of outer housing 16, through an aperture 122 in housing 40 and terminates in an abutting, registering relationship with outlet port 76 solenoid 48. An o-ring 110 is provided to seal the radially outwardmost end of static pressure sensing tube 111 with port 76.

Tubes 98 and 111 are preferrably formed of copper, brass or the like. However, it is contemplated that other suitable material could be employed. Additionally, it is contemplated that the passageways provided by tubes 98 and 111 could be provided integrally within housings 16 and 16a and swirl vane/venturi assembly 18 as would be obvious to one skilled in the art. Additionally, stagnation pressure sensing tube 98 is disposed at the inlet of tertiary passage 28, but it is contemplated that it may be selectively positioned elsewhere.

Solenoid 40 comprises a cylindrical solenoid case 123 which fully encloses an actuating coil 124 and is disposed within cavity 46. Solenoid 124 as well as pressure transducer 44 have electrical conductors (not illustrated) which are routed to electrical connector 52 through housing 40. Within coil 124 is a slideably disposed plunger 126 which is biased into the position illustrated in FIG. 2 by means of a spring 128. Plunger 126 has two axially disposed peripherally opening v-shaped grooves 126a and 126b running the entire length thereof as well as resilient sealing pads 130 disposed within bores 132 which are axially disposed at the opposite ends thereof. In the position illustrated, the uppermost pad 103 abuts port 74 in case 123 thereby closing communication between channel 92 and grooves 126a and 126b within solenoid 48. With plunger 126 in the position illustrated, ports 78 is in fluid communication with port 76 through grooves 126a and 126b in plunger 126. When coil 124 is energized, plunger 126 will move downwardly as viewed in FIG. 2, against the biasing effect of spring 128 to a position where pad 130 will abut port 76 in case 123 thereby interrupting communication between tube 111 and grooves 126a and 126b. At the same time, communication will be established between ports 74 and 78 within solenoid 48.

With plunger 126 of solenoid 124 positioned as illustrated in FIG. 2, pressure transducer 44 operates to sense the static pressure of the air flowing within secondary passage 26. Static pressure ports 120 are disposed within the throat of venturi 20 and communicate with pressure transducer 44 through static pressure sensing tube 111, outlet port 76, grooves 126a and 126b of plunger 126, inlet port 78, aperture 88 of gasket 84, aperture 82 of the first cover plate 56, aperture 80 of gasket 58, channel 70, aperture 72 of gasket 58, aperture 68 of first cover plate 56 and finally, inlet port 66 of pressure transducer 44. Outlet port 74 of solenoid 48 is sealed by the uppermost sealing pad 130 as viewed in FIG. 2. Solenoid case 123 cover the entire peripheral surface as well as the ends of solenoid 48 with the exception of outlet ports 74 and 76 and inlet port 78. Solenoid case 123 and plunger 126 are constructed of ferrous material. Spring 128, housing 40, tube 111, first and second cover plates 56 and 60 respectively are constructed of non-magnetic material such as aluminum, copper, brass or other suitable material. As is obvious to one skilled in the art, when coil 124 is energized, an axially aligned magnetic circuit will be formed there around comprising plunger 126 and case 123. The polarity of the energizing source is applied so that the magnetic influence of coil 124 upon plunger 126 tends to move plunger 126 downwardly against the biasing influence of spring 128. Thus, when energized, plunger 128 will move downwardly into a second position in which lowermost sealing pad 130 establishes an abutting relationship with outlet port 76, thereby sealing tube 111 from pressure transducer 44.

With plunger 126 in the second position, i.e., when coil 124 is energized, pressure transducer 44 operates to sense the stagnation pressure within the inlet of tertiary passage 28 by communicating therewith through averaging apertures 98a, stagnation pressure sensing tube 98, stagnation pressure passageway 104, aperture 106 of first cover plate 56, aperture 108 of gasket 58, channel 92, aperture 96 of gasket 58, aperture 94 of first cover plate 56, aperture 90 of gasket 84, outlet port 74, grooves 126a and 126b of plunger 126, inlet port 78, aperture 88 of gasket 84, aperture 82 of first cover plate 56, aperture 80 of gasket 58, channel 70, aperture 72 of gasket 58, aperture 68 of first cover plate 56, and finally, inlet port 66 of pressure transducer 44.

Stagnation pressure sensing apertures 98a are within tertiary passage 28 in the preferred embodiment of the invention because of their tendency to eliminate surface flow effects around stagnation pressure sensing tube 98 at low flow rates. This is due to the fact that valving element 30 is closed during low flow rates and thus there is no axial velocity of air passing stagnation pressure sensing tube 98 in that condition. By alternatively energizing and deenergizing coil 124 of solenoid 48, the electrical output at connector 52 from pressure transducer 44 will alternately represent the absolute stagnation pressure of the air flowing through flowmeter assembly 10 and the absolute static pressure of the air measured in the throat of venturi 20 depending upon the position of solenoid 48. These two signals can be processed to produce an electrical signal proportioned to the difference between the two pressures. This technique is commonly referred to as "auto-referencing" which is used in obtaining accurate differential measurements. This result in a device which operates substantially identically as disclosed in U.S. Pat. No. 4,164,144 at relatively low flow rates. At relatively high flow rates, once valving element 30 is displaced in a downstream direction and air begins to flow through tertiary passage 28, the total pressure drop across flowmeter assembly 10 will be substantially decreased as compared with a device as disclosed in U.S. Pat. No. 4,164,144. The pressure differential signal from pressure transducer 44 will also be reduced, but an inconsequential amount.

Referring to FIG. 4, an alternative embodiment of a fluid flowmeter assembly 10' is illustrated in which air entering flowmeter assembly 10' passes through either a main passage 24' defined by the volume between the outside surface of a venturi 20' and the inside surface of a inner housing 16a' or, alternatively, through the throat or secondary passage 26' within venturi 20'. The outlet of venturi 20' opens adjacently downstream of a plurality of fixed angle swirl vanes 134. An outer housing 16' is disposed concentrically with inner housing 16a' and is mounted thereto at the upstream thereof a portion generally designated 136. Outer housing 16' has an area of increased diameter generally designated 138 which forms a tertiary passage 28 which is defined by the volume between the inside surface of area increased diameter 138 and the outside surface of inner housing 16a'. Adjacently downstream of a transition point 140 of outer housing 16' which interconnects areas 136 and 138, is a polarity of circumferentially spaced ports 142 which communicate main passage 24' at a point upstream of swirl vanes 134 with tertiary passage 28'. Overlaying ports 142 on the peripheral outside surface of inner housing 16a' is a thin band 144 of extremely resilient material, such as rubber, which is impervious to air flow. The upstreammost end of band 144 is secured within a slot 146 defined by inner and outer housing 16a' and 16'. Tertiary passage 28' converges with the outlet of the main passage 24' at a point downstream of swirl vanes 134.

In operation, at low flow rates, band 144 is held flush against the outermost surface of inner housing 16a', thereby overlaying ports 142 and forcing all air flowing through flowmeter assembly 10' to pass through either venturi 20' or main passage 24'. As the flow rate increases, the pressure drop across flowmeter assembly 10' increases to a point at which the radial pressure exerted by the air within main passage 24' through ports 142 in impinging upon band 144 temporarily deflect or stretch it away from its normal position. When the downstream portion of band 144 is so deflected radially outwardly, a portion of the air in main passage 24' will pass through ports 142 into tertiary passage 28', thereby effectively reducing the total pressure drop presented by flowmeter assembly 10' to the air moving therethrough. This flow of air is indicated by arrows generally designated 148. When the air flow through flowmeter assembly 10' again is reduced to a relatively low rate, band 144 will reassume its rest position thereby blocking ports 142 and once again forcing all air passing through flowmeter assembly 10' to pass through venturi 20' or main passage 24'. As is obvious to one skilled in the art, the alternative embodiment of the invention disclosed in FIG. 4 is an extremely low cost version in which inner and outer housing 16a' and 16' are constructed of plastic or other inexpensive material which is not susceptible to corrosion. Additionally, the venturi 20' and swirl vanes 134 could also be constructed of molded plastic as well as the straighting vanes (not illustrated) which would depend from the inside wall of inner housing 16a' and extend radially inwardly to supportively engage the outer surface of venturi 20'. The location of the pressure (stagnation and static) sensing elements are not disclosed in FIG. 4. However, it is contemplated that they could be selectively located in the venturi, the main passage or the bypass passage as would be obvious to one skilled in the art in light of the present disclosure and that of the above described related patent applications.

Referring to FIG. 5, a self-explanatory graphical presentation is made of the operating characteristics of the preferred embodiment of the invention over a typical engine operating range, illustrating the differential pressure (signal) versus flow rate and meter pressure drop versus flow rate.

It is to be understood that the invention has been described with reference to specific embodiments which provide the features and advantages previously described, and that such specific embodiments are susceptible of modification, as will be apparent to those skilled in the art. Accordingly, the foregoing description is not to be construed in a limiting sense.

What is claimed is:

1. A fluid flowmeter comprising: a main passage for the flow of fluid therethrough;
    swirl means disposed within said main passage and operative to form a low static pressure region immediately downstream thereof;
    a secondary passage disposed within said main passage for communicating a portion of the fluid upstream of said swirl means to a point downstream of said swirl means adjacent said low static pressure region;
    means for sensing the pressure of the fluid in said low static pressure region and the pressure of the fluid before said swirl means; and
    a bypass passage operative to selectively interconnect a point upstream of said swirl means with a second point downstream of said swirl means radially outwardly adjacent the low pressure region.

2. The fluid flowmeter of claim 1, further comprising valve means associated with said bypass passage of operative to selectively restrict the flow of fluid therethrough.

3. The fluid flowmeter of claim 2, wherein said valve means operates to decrease restriction of said bypass passage on a function of the flow rate of the fluid through said flowmeter.

4. The fluid flowmeter of claim 2, wherein said valve means operates to close said bypass passage when the flow rate of the fluid through said flowmeter falls below a predetermined value.

5. The fluid flowmeter of claim 4, further comprising adjustment means operative to selectively vary said predetermined value.

6. The fluid flowmeter of claim 1, wherein said bypass passage is concentric to said main passage.

7. A fluid flowmeter comprising:
    a main passage for the flow of a fluid therethrough and defining a central axis;
    swirl means disposed in said main passage and receiving at least a portion of a fluid flowing in the main passage to swirl the fluid about the central axis at a relatively high velocity for forming a low static pressure region about the central axis immediately downstream of said swirl means;
    a secondary passage disposed about the central axis for communicating a portion of the fluid in said main passage upstream of the swirl means with the low pressure region;
    means for sensing said low static pressure;
    means for sensing the pressure of the fluid before the swirl means; and
    a bypass passage operative to selectively interconnect a point upstream of said swirl means with a second point downstream of said radially outwardly swirl means adjacent the low pressure region.

8. The fluid flowmeter of claim 7, further comprising valve means operative to interrupt fluid communication through said bypass passage when the rate of flow through said flowmeter falls below a predetermined value.

9. The fluid flowmeter of claim 8, further comprising adjustment means operative to selectively vary said predetermined value.

10. The fluid flowmeter of claim 7, wherein said bypass passage is concentric to said main passage.

11. The fluid flowmeter of claim 7, wherein said secondary passage comprises a venturi tube.

12. An improved fluid flowmeter of the type including a main passage for the flow of a fluid therethrough and defining a central axis, swirl means disposed in said main passage to swirl the fluid about the central axis at a relatively high velocity for forming a low static pressure region about the central axis immediately downstream of said swirl means, a secondary passage disposed about the central axis for communicating a portion of the fluid in said main passage upstream of the swirl means with the low pressure region, means for sensing said low static pressure and the pressure of the fluid before the swirl means, said improvement comprising:
    a bypass passage operative to selectively interconnect a point upstream of said swirl means with a second point downstream of said radially outwardly swirl means adjacent the low pressure region.

13. The fluid flowmeter of claim 12, further comprising valve means operative to interrupt fluid communication through said bypass passage when the rate of flow through said flowmeter falls below a predetermined value.

14. A fluid flowmeter comprising:
    a main fluid flow passage having a central axis;
    swirl means disposed in the main passage and receiving at least a portion of the fluid flowing in the main passage to swirl the fluid about the central axis at a relatively high velocity for forming a low static pressure region about the central axis;

a secondary passage disposed about the central axis concentrically within said main passage for communicating a portion of the fluid in said main passage upstream of the swirl means with the low pressure region;

means for sensing the low static pressure;

means for sensing the pressure of the fluid before the swirl means;

a bypass passage disposed concentrically with and radially outwardly from said main passage, said bypass passage operative to selectively interconnect a point upstream of said swirl means with a second point downstream of said swirl means radially outwardly adjacent the low pressure region; and valve means associated with said bypass passage and operative to selectively open and close said bypass passage as a function of the rate of fluid flow through said flowmeter, said valve restricting said bypass passage at relatively low flow rates and opening said bypass passage at relatively high flow rates.

15. The fluid flowmeter of claim 14, wherein said secondary passage comprises a venturi and said means for sensing the low static pressure is disposed in the throat of said venturi.

16. A fluid flowmeter comprising:

a main passage for the flow of fluid therethrough;

swirl means disposed within said main passage;

a secondary passage disposed within said main passage for communicating a portion of the fluid upstream of said swirl means to a point downstream of said swirl means adjacent a low static pressure region formed by said swirl means;

means for sensing the pressure of the fluid in said low static pressure region;

a bypass passage operative to selectively interconnect a point upstream of said swirl means with a second point downstream of said swirl means; and means disposed within said bypass passage for sensing the pressure of the fluid before said swirl means.

17. A fluid flowmeter comprising:

a main passage for the flow of a fluid therethrough and defining a central axis;

swirl means disposed in said main passage and receiving at least a portion of a fluid flowing in the main passage to swirl the fluid about the central axis at a relatively high velocity for forming a low static pressure region about the central axis;

a secondary passage disposed about the central axis for communicating a portion of the fluid in said main passage upstream of the swirl means with the low pressure region;

means for sensing said low static pressure;

a bypass passage operative to selectively interconnect a point upstream of said swirl means with a second point downstream of said swirl means; and means disposed within said bypass passage for sensing the pressure of the fluid before the swirl means.

18. A fluid flowmeter comprising:

a main fluid flow passage having a central axis;

swirl means disposed in the main passage and receiving at least a portion of the fluid flowing in the main passage to swirl the fluid about the central axis at a relatively high velocity for forming a low static pressure region about the central axis;

a secondary passage disposed about the central axis concentrically within said main passage for communicating a portion of the fluid in said main passage upstream of the swirl means with the low pressure region;

means for sensing the low static pressure;

a bypass passage operative to selectively interconnect a point upstream of said swirl means with a second point downstream of said swirl means;

valve means associated with said bypass passage and operative to selectively open and close said bypass passage as a function of the rate of fluid flow through said flowmeter, said valve restricting said bypass passage at relatively low flow rates and opening said bypass passage at relatively high flow rates; and means disposed within said bypass passage, upstream of said valve means for sensing the pressure of the fluid before the swirl means.

* * * * *